(12) United States Patent
Marquardt

(10) Patent No.: US 10,739,182 B2
(45) Date of Patent: Aug. 11, 2020

(54) APPARATUSES, SYSTEMS, AND METHODS FOR DETERMINING FLUID LEVELS IN OBJECTS

(71) Applicant: Trico Corp., Pewaukee, WI (US)

(72) Inventor: Brian J. Marquardt, Seattle, WA (US)

(73) Assignee: Trico Corp., Pewaukee, WI (US)

( * ) Notice: Subject to any disclaimer, the term of this patent is extended or adjusted under 35 U.S.C. 154(b) by 198 days.

(21) Appl. No.: 15/810,415

(22) Filed: Nov. 13, 2017

(65) Prior Publication Data

US 2018/0136029 A1 May 17, 2018

Related U.S. Application Data

(60) Provisional application No. 62/420,913, filed on Nov. 11, 2016.

(51) Int. Cl.
*G01F 23/292* (2006.01)
*G01F 23/00* (2006.01)

(52) U.S. Cl.
CPC ........ *G01F 23/292* (2013.01); *G01F 23/0007* (2013.01); *G01F 23/0061* (2013.01); *G01F 23/0069* (2013.01); *G01F 23/2921* (2013.01)

(58) Field of Classification Search
CPC .............. G01F 23/292; G01F 23/0007; G01F 23/0069; G01F 23/2921; G01F 23/0061
See application file for complete search history.

(56) References Cited

U.S. PATENT DOCUMENTS

| 4,119,860 A | 10/1978 | Gooley |
| 5,274,245 A | 12/1993 | Lee |
| 6,502,461 B2 | 1/2003 | Keller |

(Continued)

FOREIGN PATENT DOCUMENTS

| DE | 10327872 | 1/2004 |
| EP | 2333394 | 6/2011 |

(Continued)

OTHER PUBLICATIONS

"A Lubrication System for a dry sump automotive two-stroke engine," Research Disclosure, Mason Publications, Aug. 1, 1992, 340:665.

(Continued)

*Primary Examiner* — Eric S. McCall
*Assistant Examiner* — Timothy P Graves
(74) *Attorney, Agent, or Firm* — Andrus Intellectual Property Law, LLP

(57) ABSTRACT

A fluid level determining system is for determining a fluid level of a fluid in a reservoir having an interior surface and an opposite, exterior surface. The fluid level determining system includes an emitter configured to be positioned along the exterior surface of the reservoir and emit signals into the reservoir and a receiver configured to be positioned along the exterior surface of the reservoir such that the receiver is oriented in the direction of the emitter. The receiver is configured to receive signals from the emitter passing out of the reservoir. The signals received by the receiver are attenuated relative to the signals emitted by the emitter into the reservoir. A controller is in communication with the receiver and configured to determine the fluid level based on the signals received by the receiver.

16 Claims, 9 Drawing Sheets

(56) References Cited

U.S. PATENT DOCUMENTS

| | | |
|---|---|---|
| 7,107,838 B2 | 9/2006 | Chai et al. |
| 7,830,268 B1 | 11/2010 | MacDonald |
| 2002/0166377 A1 | 11/2002 | Baron et al. |
| 2002/0194911 A1 | 12/2002 | Allegre |
| 2003/0230141 A1 | 12/2003 | Gilmour et al. |
| 2004/0250623 A1 | 12/2004 | Walker et al. |
| 2006/0176158 A1 | 8/2006 | Fleming |
| 2013/0269832 A1 | 10/2013 | Gengerke |
| 2015/0323369 A1 | 11/2015 | Marquardt |
| 2015/0362350 A1 | 12/2015 | Miller et al. |
| 2016/0375185 A1* | 12/2016 | Meisberger ......... A61M 1/3627 250/341.7 |

FOREIGN PATENT DOCUMENTS

| | | |
|---|---|---|
| WO | 2004090504 | 10/2004 |
| WO | 2015003765 | 7/2013 |
| WO | 2015187682 | 12/2015 |

OTHER PUBLICATIONS

International Search Report and Written Opinion for PCT/US2015/029884 dated Aug. 28, 2015.
International Search Report and Written Opinion for PCT/US2015/033765 dated Aug. 28, 2015.

* cited by examiner

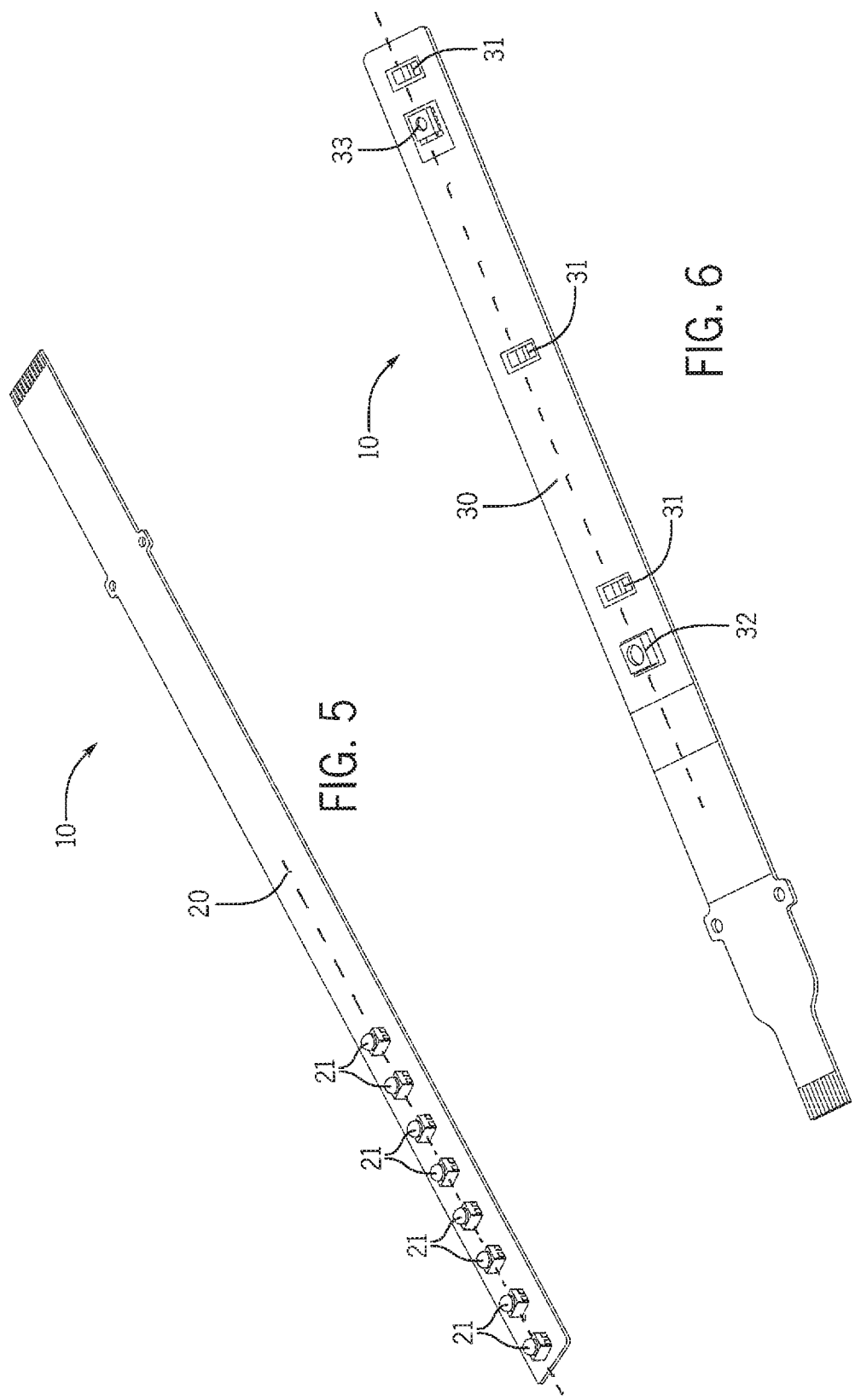

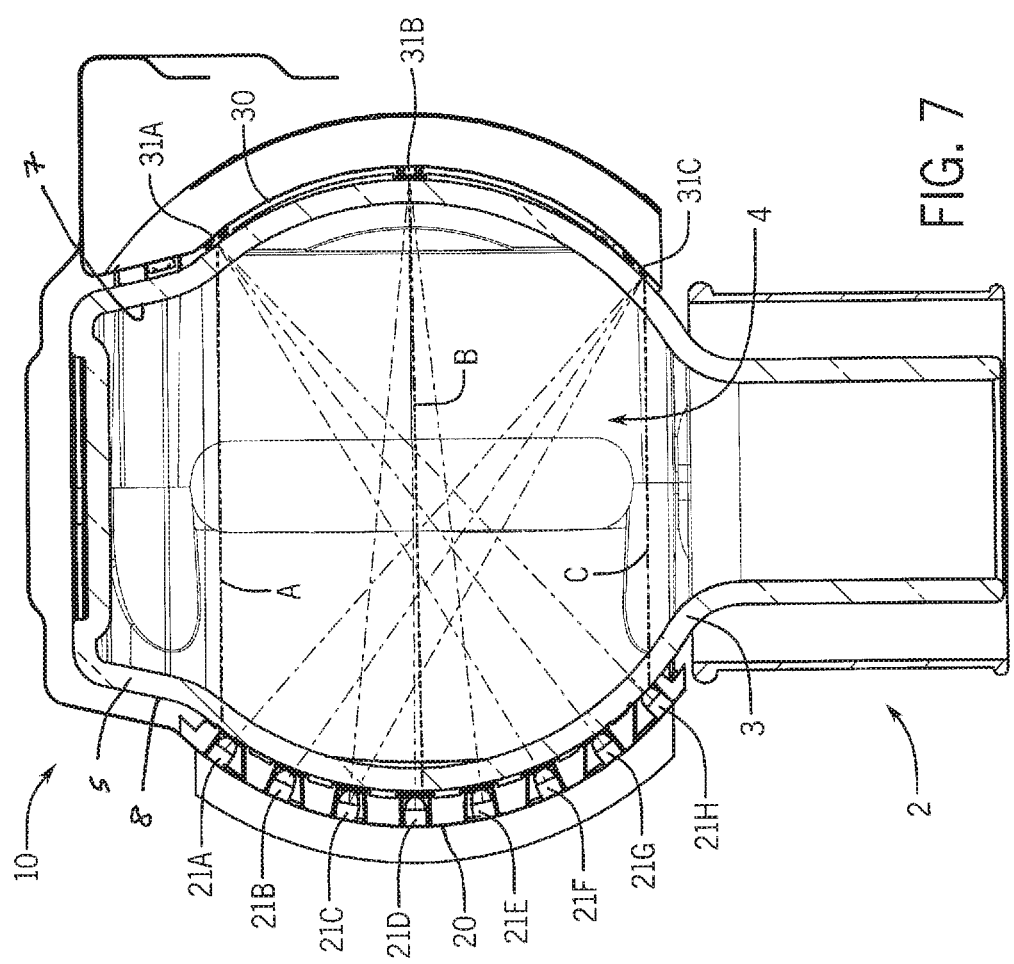

APPARATUSES, SYSTEMS, AND METHODS FOR DETERMINING FLUID LEVELS IN OBJECTS

CROSS-REFERENCE TO RELATED APPLICATION

The present application is based on and claims priority to U.S. Provisional Patent Application Ser. No. 62/420,913 filed Nov. 11, 2016, the disclosure of which is incorporated herein by reference.

FIELD

The present disclosure relates to apparatuses, systems, and methods for determining fluid levels of fluids contained in objects, specifically apparatuses, systems, and methods for determining liquid levels of liquids, such as lubricants, in machine reservoirs.

BACKGROUND

The following U.S. Patent Application Publication is incorporated herein by reference in entirety.

U.S. Patent Application Publication No. 2015/0323369, published on Nov. 12, 2015 discloses sensor and receiver pairs that are configured monitor fluid level of a fluid in a reservoir.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a fluid level determining system for determining a fluid level of a fluid in a reservoir having an interior surface and an opposite, exterior surface has an emitter configured to be positioned along the exterior surface of the reservoir and emit signals into the reservoir and a receiver configured to be positioned along the exterior surface of the reservoir such that the receiver is oriented in the direction of the emitter. The receiver is configured to receive signals from the emitter passing out of the reservoir. The signals received by the receiver are attenuated relative to the signals emitted by the emitter into the reservoir. A controller is in communication with the receiver and configured to determine the fluid level based on the signals received by the receiver.

In certain examples, a method for determining a fluid level of a fluid in a reservoir having an exterior surface includes positioning an emitter along the exterior surface of the reservoir such that the emitter emits signals into the reservoir and positioning a receiver along the exterior surface of the reservoir such that the receiver is orientated in the direction of the emitter. The receiver is configured to receive signals from the emitter passing out of the reservoir. The signals received by the receiver are attenuated relative to the signals emitted by the emitter into the reservoir. The method can also include activating, with a controller, the emitter such that the emitter emits signals into the when the reservoir, and determining, with a controller, the fluid level based on the signals received by the receiver.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 5 is an example emitter assembly.

FIG. 6 is an example receiver assembly.

FIG. 7 is a view like FIG. 2.

DETAILED DISCLOSURE

The example apparatuses, systems, and methods described and depicted in this disclosure can include features of and/or be utilized in combination with the apparatuses, systems, and methods described in U.S. patent application Ser. No. 14/707,508 (filed May 5, 2015) and Ser. No. 14/728,626 (filed Jun. 2, 2015), which are herein incorporated by reference in entirety.

The present inventors have endeavored to make improvements to conventional apparatuses that determine and/or verify a fluid level (e.g. liquid level) of a fluid (e.g. liquid) contained in an object, such an oiler. The present inventor has recognized that it is advantageous to remotely determine or verify the liquid level of a liquid, e.g. lubricant, to increase machine efficiency and decrease monitoring and repair costs. Accordingly, the present inventor has developed the apparatuses, systems, and methods described herein.

Figure 1:
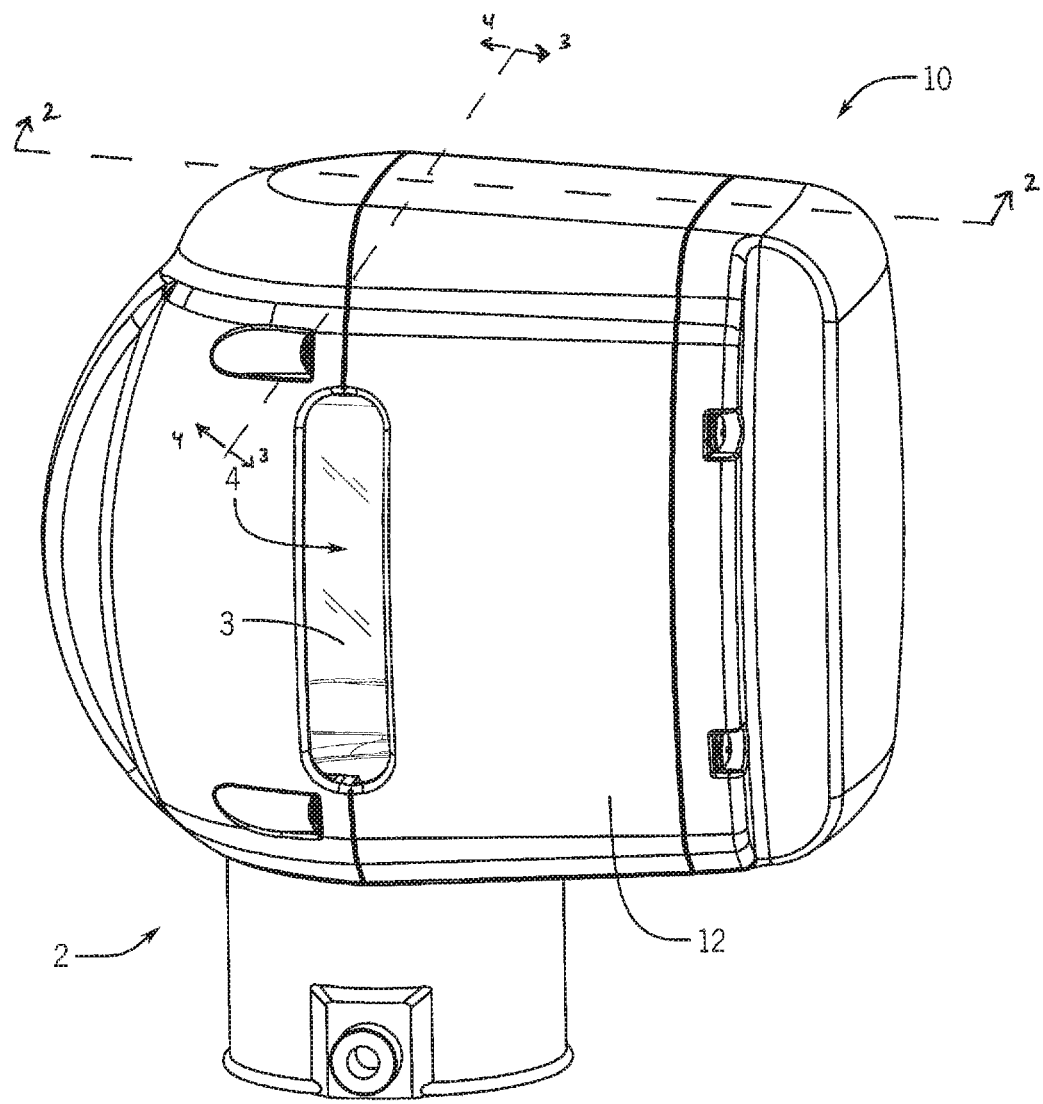
FIG. 1 is an example oiler and an exemplary embodiment of a fluid level determining system.
Figure 2:
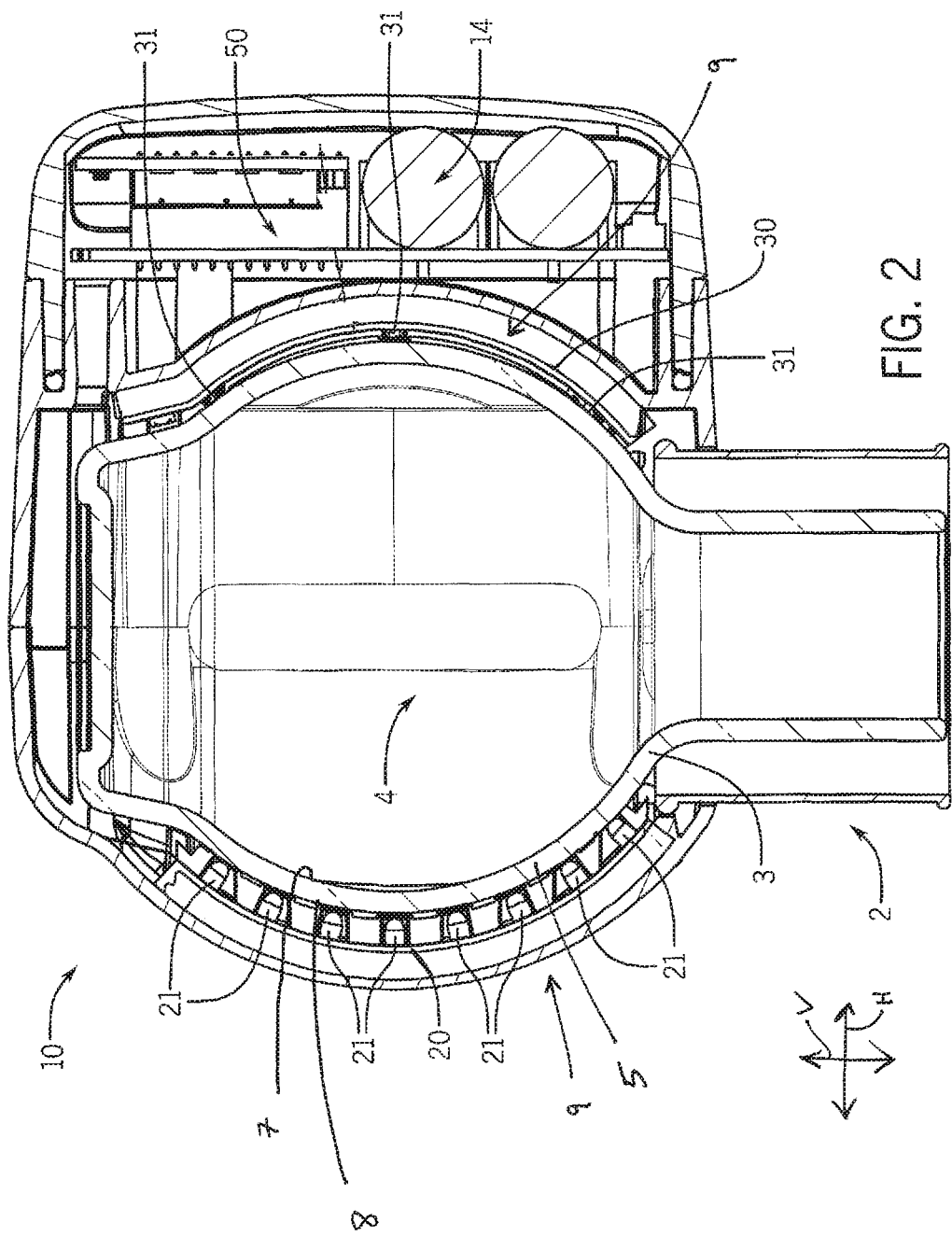
FIG. 2 is a cross sectional view of the oiler and the fluid level determining system of FIG. 1 along line 2-2 on FIG. 1.
Figure 3:
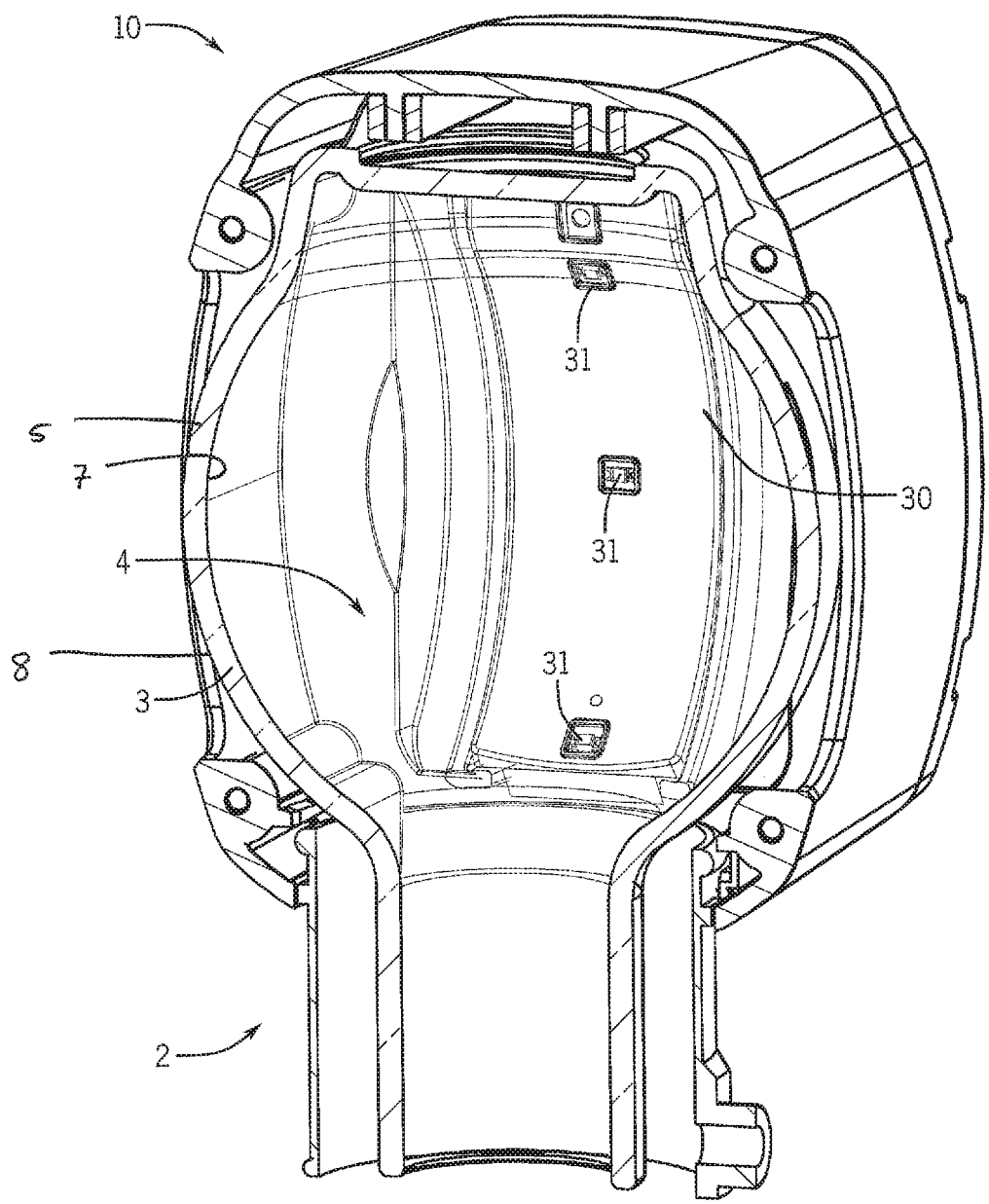
FIG. 3 is cross sectional view of the oiler and the fluid level determining system of FIG. 1 along line 3-3 on FIG. 1.
Figure 4:
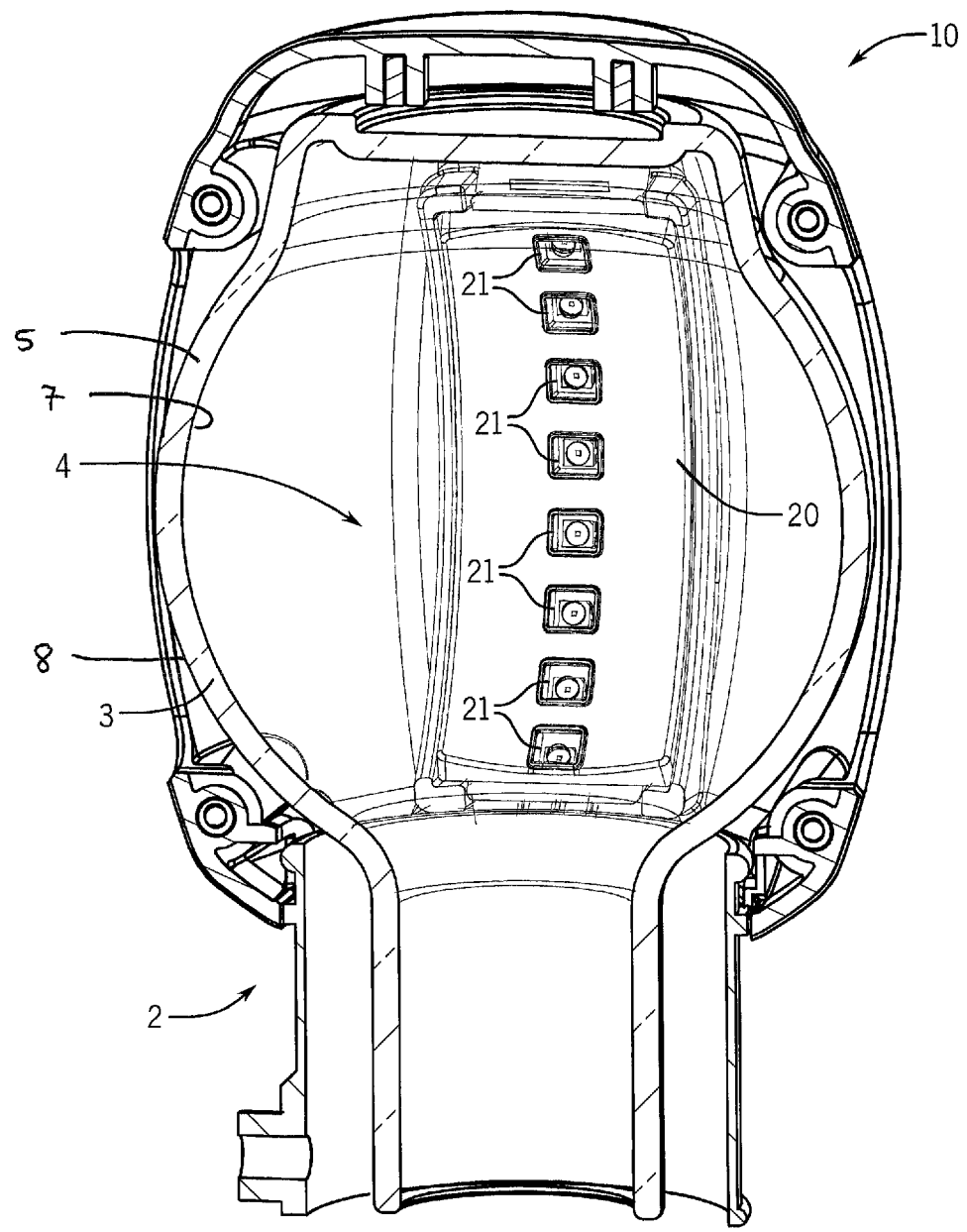
FIG. 4 is cross sectional view of the oiler and the fluid level determining system of FIG. 1 along line 4-4 on FIG. 1.

Referring to FIG. 1, an example fluid level determining system 10 for an object (e.g. an oiler 2) is depicted. The system 10 is configured to determine, including detect and verify, a liquid level of a liquid contained in the oiler 2. In the example depicted, the oiler 2 has a reservoir 3 that contains a liquid (e.g. oil, lubricant) and often some amount of air vertically above the liquid level. The reservoir 3 has a sidewall 5 having a first or interior surface 7 and an opposite, second or exterior surface 8. The reservoir 3 defines an interior space 4 in which the liquid is received and contained. The size and shape of the reservoir 3 can vary (e.g. bulb-shaped, spherical), and the sidewall 5 can be made of any suitable material (e.g. plastic, glass). The sidewall 5 can be transparent or translucent. A person having ordinary skill in the art will recognize that the system 10 can be configured to determine the presence or fluid levels of any fluid (e.g. liquids, gases) in the reservoir 3.

Figure 8:
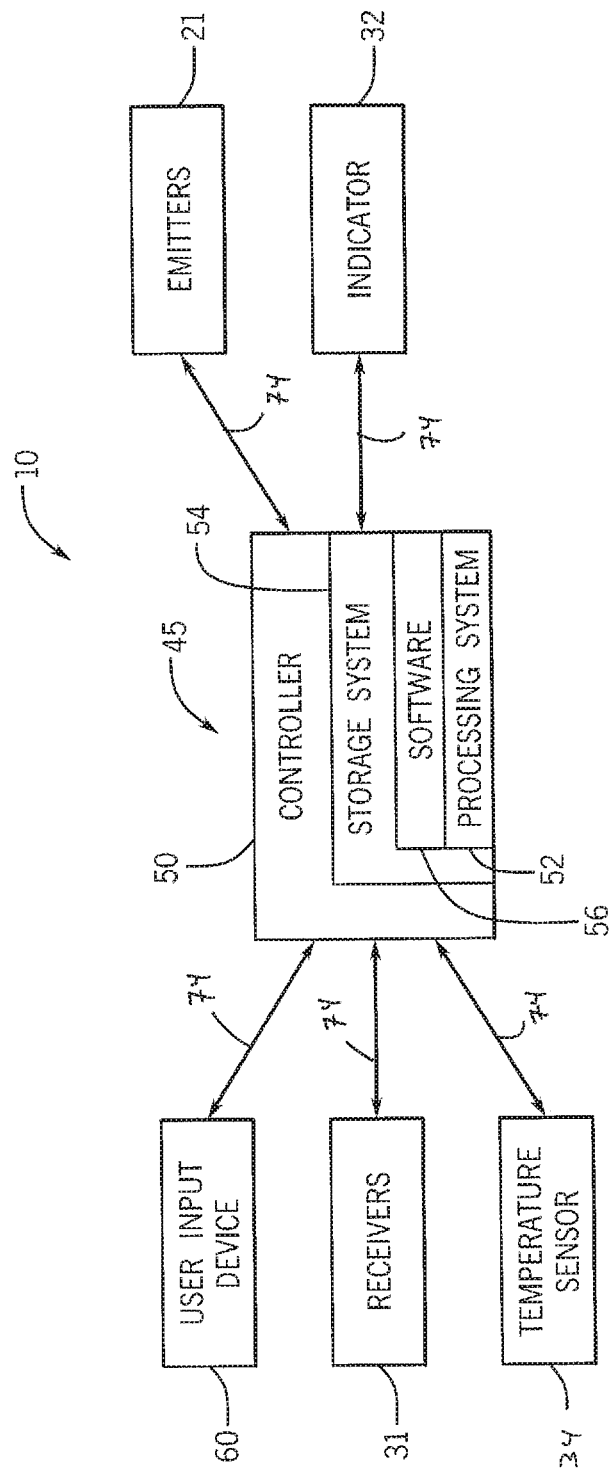
FIG. 8 is an example computing system schematic diagram.

Referring to FIGS. 2-6, the system 10 has a housing 12 that is coupled to the reservoir 3. Specifically, the housing 12 is coupled to the exterior surface 8 of the sidewall 5. The shape of the housing 12 can vary and is preferably shaped to correspond with, including match or fit, the reservoir 3. The housing 12 is also configured to house or contain other components of the system 10 described herein. For example, the housing 12 may also house a power supply 14 (see FIG. 2) which is configured to provide power to the system 10 and a controller 50 (FIG. 8).

The system 10 includes an emitter assembly 20 having at least one emitter 21 disposed thereon and a corresponding receiver assembly 30 having at least one receiver 31 disposed thereon. In an exemplary embodiment, the emitter assembly 20 and the receiver assembly 30 may be constructed of a flexible body to which the respective emitter(s) 21 and receiver(s) 31 are secured. The flexible body facilitates holding the at least one emitter 21 and the at least one receiver 31 against the exterior surface 8 of the sidewall 5 The assemblies 20, 30 are coupled to the reservoir 3 such that the emitter(s) 21 and the receiver(s) 31 are positioned along and adjacent to the exterior surface of the sidewall 5. As such, the emitter(s) 21 emit electromagnetic radiation, including electromagnetic signals, (e.g. visible light, infrared radiation) through the sidewall 5 and into the interior space 4 of the reservoir 3 and the receiver(s) 31 receive electromagnetic radiation that has been emitted from the emitter(s) 21 into the reservoir 3 through the sidewall 5. The electromagnetic radiation received by the receiver(s) 31 is attenuated relative to the electromagnetic radiation that is emitted by the emitter(s) 21 due to the electromagnetic radiation being scattered, absorbed, or otherwise as the electromagnetic radiation travels through the sidewall 5 and fluids (e.g. liquid, gas) contained in the reservoir 3. Accordingly, the liquid level of the liquid in the reservoir 3 can be determined by the system 10 (further described herein).

The emitter(s) 21 and the receiver(s) 31 are positioned adjacent to the exterior surface 8 of the sidewall 5, and the emitter(s) 21 and the receiver(s) 31 can contact, e.g. abut, the exterior surface 8 of the sidewall 5 or be spaced a desired distance from the exterior surface of the sidewall 5. The emitter(s) 21 and the receiver(s) 31 are positioned relative to each other such that the emitter(s) 21 are oriented in the direction (e.g. oriented toward) of the receiver(s) 31 and the receiver(s) 31 receive electromagnetic radiation emitted by the emitter(s) 21. In one non-limiting exemplary embodiment, the emitter(s) 21 are positioned opposite the receiver(s) 31 on the exterior surface of the sidewall 5 (e.g. the emitter(s) 21 and the receiver(s) 31 are each positioned on the exterior surface 8 of the sidewall 5 on opposite sides or ends 9 of the reservoir 3). Through research and experimentation, the present inventor has found it advantageous to position the emitter(s) 21 opposite the receiver(s) 31 to improve accuracy and operation of the system 10 when determining the fluid level of the fluid in the reservoir 3.

The assemblies 20, 30 are coupled to the reservoir 3 by any suitable means such as adhesives, mechanical connections, compression bands, and/or the like. For example, the housing 12 can be configured to cause the assemblies 20, 30 to be compressed into contact with the sidewall 5. In other exemplary embodiments, the assemblies 20, 30 are laid along the sidewall 5 and adhesive tape is configured to couple, e.g. adhere or stick, the assemblies 20, 30 to the exterior surface of the sidewall 5.

As is briefly described above, the emitter(s) 21 are configured to emit electromagnetic radiation through the sidewall 5 and into the interior space 4 and the liquid contained therein. The emitted electromagnetic radiation may exemplarily be, but not limited to, frequencies of visible light, infra-visible light (e.g. infrared radiation), and surpa visible light (e.g. ultraviolet). In one exemplary embodiment, the emitter(s) 21 is an infrared light emitting diode that is configured to emit infrared radiation. Examples of infrared radiation emitting diodes are commercially available from Mouser Electronics (part #720-SFH4249-Z) and Digi-Key (part #475-2655-2-ND).

The receiver(s) 31 are configured to receive the electromagnetic radiation from one or any number of emitter(s) 21 and send or transmit signals to a controller 50 (described herein) that correspond to the electromagnetic radiation received by the receiver(s) 31. That is, the receiver(s) 31 are configured is send or transmit signals (e.g. analogue signals, digital signals), which may include a value, that correspond to the amount or number of electromagnetic radiation received by the receiver(s) 31. Any suitable receiver(s) 31 can be utilized, and it should be recognized by a person having ordinary skill in the art that the receiver(s) 31 should be selected to be compatible with and configured to receive the type of electromagnetic radiation emitted from the emitter(s) 21. In one exemplary embodiment, the receiver(s) 31 is an infrared receiver. Examples of infrared receivers are commercially available from Mouser Electronics (part #638-PD1521BTR8) and Digi-Key (part #1080-1365-6-ND).

Now referring to FIG. 7, a non-limiting exemplary embodiment of the system 10 and the assemblies 20, 30 is depicted. In this exemplary embodiment, the emitter assembly 20 and the receiver assembly 30 are depicted coupled to the exterior surface 8 of the reservoir 3. The emitter assembly 20 includes eight emitters 21A-21H which are positioned and arranged in a single vertical linear array (e.g. vertically arranged linear column) along the longitudinal dimension or length of the emitter assembly 20 (see also FIG. 5) such that each emitter 21A-21H is spaced equidistant from adjacent emitters 21A-21H (e.g. second emitter 21B is spaced apart from the first emitter 21A and the third emitter 21C by a preselected distance) (e.g. the emitters 21A-21H are aligned relative to each other on the emitter assembly 20 and are aligned along the exterior surface 8 of the sidewall 5). As described above, the emitters 21A-21H are configured to emit electromagnetic radiation through the sidewall 5 into the interior space 4 and liquid contained therein such that the electromagnetic radiation, including attenuated electromagnetic radiation, is received by one or more than one receiver 31A-31C.

The receiver assembly 30 is coupled to the exterior surface of the sidewall 5 such that the electromagnetic radiation is received by the receivers 31. The receiver assembly 30 includes three receivers 31A-31C which are aligned with each other and arranged in a single vertical linear array (e.g. vertically arranged linear column) along the longitudinal (e.g. vertical) dimension or length of the receiver assembly 30 (see also FIG. 6). In certain exemplary embodiments, the receivers 31A-31C are equidistant from adjacent receivers 31A-31C (e.g. second receiver 31B is spaced apart from the first receiver 31A and the third receiver 31C by a preselected distance). In certain exemplary embodiments, the receivers 31A-31C are positioned at desired or preselected vertical positions along the exterior surface 8 of the sidewall 5 that correspond to preselected liquid levels. In an exemplary embodiment, the preselected liquid levels may correspond to a maximum liquid level of liquid in the reservoir 3 (see dashed liquid level line A on FIG. 7), an operating liquid level of the liquid in the reservoir 3 (see dashed liquid level line B on FIG. 7), and a minimum liquid level of the liquid in the reservoir 3 (see dashed liquid level line C on FIG. 7). The first receiver 31A is positioned at the maximum liquid level, the second receiver 31B is positioned at the operating liquid level, and the third receiver 31C is positioned at the minimum liquid level. The receivers 31A-31C can be configured to receive electromagnetic radiation from one or multiple emitters 21A-21H. In an exemplary embodiment, the second receiver 31B receives electrical signals (shown in dashed lines) from three different emitters 21C, 21D, 21E. (Note that the dash-dot-dash lines on FIG. 7 depict exemplary signals transmitted by the emitters 21A-H and received by the receivers 31A-C, and for clarity, a single exemplary signal is depicted emitting from the emitters 21A-H. However, a person having ordinary skill in the art will recognize that the path and number signals emitted by the emitters 21A-H can vary and the receivers 31A-C can receive any number of signals from the emitters 21A-H).

Referring to FIG. 8, the system 10 includes a controller 50 in communication with the emitters 21 and the receivers 31. The controller 50 is part of a computing system 45. The controller 50 includes a processing system 52, storage system 54, and software 56. The processing system 52 loads and executes software 56 from the storage system 54. When executed by the controller 50, the software 56 directs the processing system 52 to operate to carry out the methods described herein. The components and devices of the system 10 described herein are in communication with the controller 50 via wired and/or wireless communication links 74.

It should be understood that one or more software application modules could be provided within the software to carry out the same operation. Similarly, while the description as provided herein refers to a controller 50 and a processing system 52, it is to be recognized that implementations of such systems can be performed using one or more processors, which may be communicatively connected, and such implementations are considered to be within the scope of the description.

The processing system 52 can comprise a microprocessor and other circuitry that retrieves and executes software 56 from storage system 54. Processing system 52 can be implemented within a single processing device but can also be distributed across multiple processing devices or subsystems that cooperate in existing program instructions. Examples of processing system 52 include general purpose central processing units, application specific processors, and logic devices, as well as any other type of processing device, combinations of processing devices, or variations thereof.

The storage system 54 can comprise any storage media readable by processing system 52, and capable of storing software 56. The storage system 54 can include volatile and non-volatile, removable and non-removable media implemented in any method or technology for storage of information, such as computer readable instructions, data structures, program modules, or other data. Storage system 54 can be implemented as a single storage device but may also be implemented across multiple storage devices or subsystems. Storage system 54 can further include additional elements, such as a controller, capable of communicating with the processing system 52.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User input device 60 can include a mouse, a keyboard, a voice input device, a touch input device, a motion input device, and other comparable input devices and associated processing elements capable of receiving user input from a user. Output devices such as a video display or graphical display can display an interface further associated with embodiments of the system and methods as disclosed herein. Speakers, printers, bells and other types of output devices may also be included in the user input device 60. The user input device 60 may display the computing system 45 on a display screen, and/or may announce it via a speaker.

The controller 50 is configured to be in communication with the emitter(s) 21 and the receiver(s) 31. The controller 50 is further configured to control the emitter(s) 21 to thereby emit electromagnetic radiation and receive signals, e.g. receiver signals, from the receiver(s) 31 when the receiver(s) 31 receives or senses electromagnetic radiation emitted by the emitter(s) 21. In operation, the receiver(s) 31 are configured to send receiver signals that correspond to the electromagnetic radiation, or value thereof, received from the emitter(s) 21 to the controller 50. The receiver signals may correspond to the number of emitters 21 from which electromagnetic radiation is received (e.g. the receiver 31 receives electromagnetic radiation from four emitters 21) and/or the intensity of the electromagnetic radiation received.

In one exemplary operation of the system 10, the controller 50 activates each emitter 21 in sequence (e.g. the controller 50 activates the first emitter 21A then the controller 50 activates the second emitter 21B, etc.) such that the activated emitter 21 emits an electromagnetic radiation (e.g., light energy) toward the sidewall 5. The electromagnetic radiation passes through the sidewall 5 and into the interior space 4 and the liquid contained therein. The electromagnetic radiation then passes through the sidewall 5 and is received or sensed by at least one receiver 31. Based on the electromagnetic radiation received, the receiver 31 sends to the controller 50 a receiver signal that corresponds to the electromagnetic radiation received. The controller 50 processes the receiver signal(s) and compares the receiver signal(s) to a preprogrammed data set that correlates the receiver signal(s) to the liquid level of the liquid in the reservoir 3. For instance, the controller 50 may determine that receiver signals received from the receivers 31 correlate to a level of fluid equivalent to the operating liquid level (see dashed liquid level line B in FIG. 7). In certain exemplary embodiments, the controller 50 compares (e.g. via subtraction or normalization) known "empty reservoir" values (which can be preprogrammed into the controller 50 and/or programmed by the controller 50, emitters 21, and/or receivers 31 during a set-up mode sequence in which "empty reservoir" values are determined with an empty reservoir 3) and to a currently measured set of values (as described above). This allows a reduced-noise, direct comparison between received electromagnetic radiation and the known electromagnetic radiation ambient to an empty reservoir at the use location to thereby account for the refractive effect on the electromagnetic radiation passing through the sidewall 5 and/or the reservoir 3.

In another exemplary operation of the system 10, the receivers 31 are configured to sense all electromagnetic radiation from all the emitters 21. The paths along which the electromagnetic radiation travels between the emitters 21 and the receivers 31 varies based on the refractive index of the liquid (e.g. lubricant, oil) and the refractive index of the air in the reservoir 3 above the liquid level, and the difference there between. That is, electromagnetic radiation emitted by the emitters 21 positioned above the liquid level of the liquid will reflect off the top of the liquid level and be received more strongly by receivers 31 that are also positioned above the liquid level compared to receivers 31 positioned below the liquid level. The receivers 31 that are positioned above the liquid level will receive move light from emitters 21 positioned above the liquid level when there is liquid in the reservoir 3 in comparison to when the reservoir 3 has no liquid contained therein. Similarly, electromagnetic radiation emitted from the emitters 21 positioned below the liquid level will reflect internally relative to the liquid (e.g. remain in the liquid) and will reflect off the liquid level and be received more strongly by receivers 31 positioned below the liquid level.

In an exemplary embodiment, the emitters 21 are light emitting diodes (LEDs) which emit electromagnetic radiation at least one wavelength in a preselected direction defined by the orientation of the emitter 21 relative to the sidewall 5. For instance, the curvature of the sidewall 5 (e.g. curved sidewall) at least partially determines the orientation at which the emitters 21 emit the electromagnetic radiation into reservoir 3 and/or the liquid. Each emitter 21 is energized by the controller 50 exemplarily in a preselected pattern, and as each emitter 21 is energized, the controller 50 receives receiver signals from the receivers 31. Based on the different absorption and/or refraction properties of the liquid and air in the reservoir 3, the electromagnetic radiation received by each of the receivers 31 will differ depending upon the liquid level of the liquid in the reservoir 3. Accordingly, a reliable estimate of liquid level can be determined by the controller 50 and/or indicated to the operator.

In certain exemplary embodiments, the system 10 includes an indicator 32 (see FIG. 8) configured to indicate the status of the system 10 to an operator. The indicator 32 can be configured to produce an audible tone and/or visible alert (e.g. visible light) to communicate the status of the system 10 to the operator. The indicator 32 is configured to provide a visual alert pertaining to the system 10 status (e.g. a low oil level sensed, the system 10 has lost contact with a wireless network (described herein)). The indicator 32 can be controlled by a controller 50 (described herein). The indicator 32 can be positioned on any suitable component of the system described herein. In one exemplary embodiment, the indicator 32 is positioned on and coupled to the receiver assembly 30. Any suitable indicator can be used, and in one exemplary embodiment, the indicator is a red LED manufactured by Mouser Electronics, part # VLMR51Z1AA-GS08.

In certain exemplary embodiments, the system 10 includes a temperature sensor configured to sense the temperature of the liquid in the reservoir 3 and/or the ambient air around the reservoir 3. The temperature sensor 34 is in communication with the controller 50 (FIG. 8) and if configured receiver a signal to the controller 50 that corresponds to the temperature sensed. Any suitable temperature sensor can be used, and in one exemplary embodiment, the temperature sensor 34 is a manufactured by Mouser Electronics, part # SI7006-A20-IM1.

Figure 9:
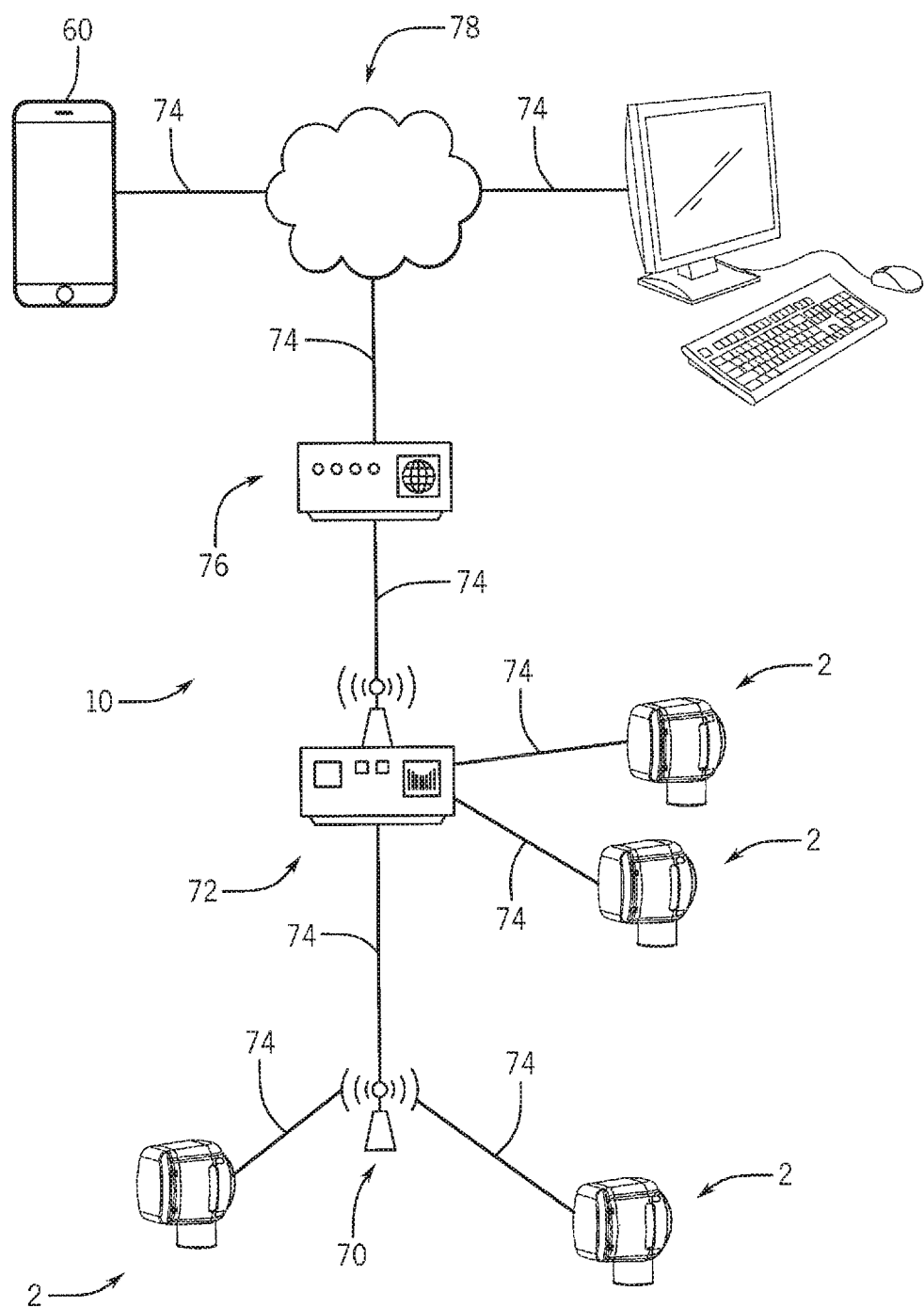
FIG. 9 is an example network schematic diagram.

Referring to FIG. 9, the system 10 is configured to determine the liquid level for multiple oilers 2. Each oiler 2 includes an emitter assembly 20 having emitters 21 and a receiver assembly 30 having receivers 31, as described above (see FIGS. 2-7). The emitters 21 and the receivers 31 are networked together by the controller 50, a repeater 70, and/or a gateway 72. The emitter assemblies 20 and the receiver assemblies 30 are in communication with repeater 70 and/or gateway 57 through wired and/or wireless communication links 74 to create a communication network. The type of communication network and/or computing and protocols can vary. Example communication networks and protocols can also be used include ZigBee, eNet, Wi-Fi, and/or the like. The gateway 72 can also be in communication with a network server or internet protocol network 76 to a cloud hosted data storage system 78. The cloud hosted data storage system 78 can be linked to the user input devices 60 and/or configured to display operational details pertaining to the emitter assemblies 20, the receiver assemblies 30, and/or the liquid levels of liquid in each oiler 2.

Figure 10:
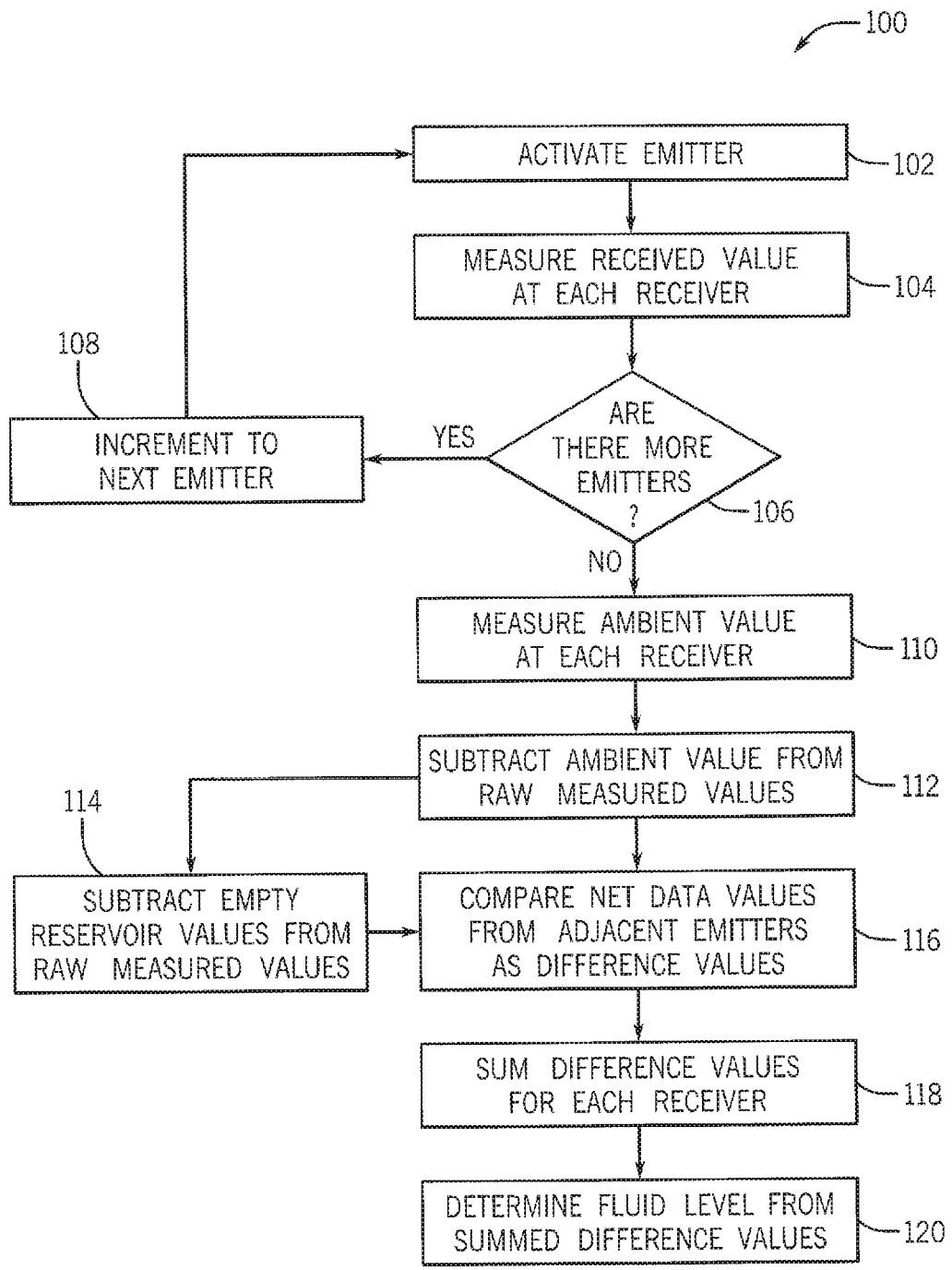
FIG. 10 is a flow chart that depicts an exemplary embodiment of a method of determining a fluid level.

Referring to FIG. 10, an example flow diagram of an example method 100 of determining the liquid level of a liquid in oiler 2 using the system 10 is depicted. The flow diagram determines the amount of liquid relative to a maximum fill line (see dashed line A in FIG. 7) (as described above) expressed as a percentage fill value.

The method 100 includes activating an emitter 21 at 102. In an exemplary embodiment, the emitter 21 emits visible light. At 104 each of a plurality of receivers 31 measure a value of the received light at each of the receivers 31. As discovered above, the plurality of receivers 31 exemplarily include a receiver 31 located at an area nominally significant position (e.g. nominally full, half, and nominally empty).

At 106 the method 100 identifies if there are more emitters 21 to be used in the measurement and if so, then at 108 the method 100 increments to the next emitter 21 and that emitter 21 is activated at 102. This process continues to measure the received values at each of the receivers 31 from light emitted from each of the emitters 21 until all of the emitters 21 have been activated and the light therefrom measured.

At 110 a further measurement is taken with the receivers 31 of the ambient value when no emitters 21 are activated. In the exemplary embodiment, this measurement of the ambient value is a measurement of ambient light.

At 112 the measured ambient values are subtracted from the raw measured values at each of the receivers 31. Optionally, at 114 an empty reservoir value may be subtracted from each of the raw measured values. In an exemplary embodiment, the empty reservoir values may be actual measurements obtained by operating the machine in an empty condition with no liquid in the reservoir. In another embodiment, the empty reservoir values may be predetermined values stored at the controller, while in still further exemplary embodiments the empty reservoir values may be values stored at the controller by way of a setup or calibration procedure.

At 116 net data values (as obtained at 112 and/or 114) are compared from adjacent emitters 21 as difference values. For each receiver, the net data value measured from the pairs of adjacent emitters 21 are used to calculate a plurality of difference values.

At 118 the difference values are summed for each receiver 31.

At 120, an estimated liquid level is determined from the summed difference value. In exemplary embodiments, the summed difference value may be used to calculate ranges or other statistical measures of the values at each of the receivers 31 which then may in turn be used to calculate an index which relates to the then determined liquid level.

Table 1 included below, provides an exemplary embodiment of a data set transmitted from the receivers 31A-31C to the controller 50. The values are exemplarily based on the light received by the receivers 31A-31C from the emitters 21A-21H. The final data set corresponds to an ambient light measurement (as described above). In an exemplary embodiment, the method 100 may operate to obtain the data of Table 1 and process it to calculate an exemplary result of a liquid level of 71 percent relative to the maximum fill line A (described above).

TABLE 1

| Emitters | Receivers | | |
|---|---|---|---|
| | HIGH (31A) | MID (31B) | LOW (31C) |
| 21A | 776 | 689 | 1011 |
| 21B | 629 | 549 | 746 |
| 21C | 664 | 860 | 402 |
| 21D | 406 | 524 | 357 |
| 21E | 58 | 34 | 1510 |
| 21F | 94 | 295 | 1997 |
| 21G | 428 | 503 | 1878 |
| 21H | 965 | 237 | 1876 |
| Ambient Light | 31 | 24 | 21 |

It will be recognized that the exemplary embodiments described herein, as well as the method 100 described above are merely exemplary embodiments of the manners in which embodiments may calculate and/or determine a liquid level. In another exemplary embodiment, the data acquired by the receiver, for example as described above, may be used in a regression model to produce a calculation of an estimated liquid level. A person of ordinary skill in the art will recognize other variations of the methods as disclosed herein while remaining within the scope of the present disclosure.

In an exemplary embodiment, a method for determining a fluid level of a fluid in a reservoir includes the steps of positioning an emitter along the exterior surface of the reservoir such that the emitter emits signals into the reservoir; positioning a receiver along the exterior surface of the reservoir such that the receiver is orientated in the direction of the emitter such that the receiver can receive signals from the emitter passing out of the reservoir and the signals received by the receiver are attenuated relative to the signals emitted by the emitter into the reservoir; activating, with a controller, the emitter such that the emitter emits signals into the when the reservoir; and/or determining, with a controller, the fluid level based on the signals received by the receiver. The method can also include the steps of indicating, with an indicator, the fluid level of the fluid determined by the controller; measuring, with the receiver, an ambient value when the emitter is deactivated; and/or determining, with the controller, the fluid level based on the signals received by the receivers when the emitter is activated and the ambient value measured by the receiver.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for determining a fluid level of a fluid in a reservoir having an interior surface and an opposite exterior surface, the system comprising:

a plurality of emitters configured to be positioned along the exterior surface of the reservoir and each emitter of the plurality of emitters emits electromagnetic energy into the reservoir;

a plurality of receivers configured to be positioned along the exterior surface of the reservoir directed toward the plurality of emitters such that each receiver of the plurality of receivers receives electromagnetic energy passing out of the reservoir and outputs receiver signals that correspond to the electromagnetic energy received, and wherein the electromagnetic energy received by the plurality of receivers is attenuated relative to the electromagnetic energy emitted by plurality of the emitters into the reservoir; and a controller operably coupled to the plurality of emitters and the plurality of receivers;

wherein the controller:

sequentially activates each emitter such that each receiver outputs a receiver signal as each emitter is activated;

receives a receiver signal from each receiver as each emitter is activated;

calculates difference values for each receiver signal, wherein the difference value is the difference between value of the receiver signal and value of the electromagnetic energy emitted by the emitter that is activated;

sums the difference values for each receiver; and determines the fluid level in the reservoir based on the sum of the difference values for each receiver.

2. The system according to claim 1, wherein when the emitters of the plurality of emitters are deactivated each receiver outputs an ambient light signal having an ambient light value; and wherein controller subtracts one of the ambient light values from each value of the receiver signal.

3. The system according to claim 1, wherein the number of emitters in the plurality of emitters is less than the number of receivers in the plurality of receivers.

4. The system according to claim 1:

wherein the controller has a memory with empty reservoir values stored thereon; and wherein the controller subtracts one of the empty reservoir values from the value of the receiver signal.

5. The system according to claim 1, wherein the electromagnetic energy is infrared light.

6. The system according to claim 1, wherein when the exterior surface of the reservoir is curved the emitters are configured to extend along the exterior surface such that the electromagnetic energy emitted by the emitters converge toward a center of the reservoir.

7. The system according to claim 3, wherein the plurality of receivers comprises three receivers.

8. The system according to claim 6, wherein the receivers of the plurality of receivers are configured to be vertically spaced apart from each other along the exterior surface of the reservoir at preselected vertical positions that correspond to preselected fluid levels of the fluid within the reservoir.

9. The system according to claim 8, wherein the plurality of receivers includes first receiver configured to be positioned along the exterior surface of the reservoir at a first preselected vertical position that corresponds to a maximum fluid level of the fluid in the reservoir, a second receiver configured to be positioned along the exterior surface of the reservoir at a second preselected vertical position that corresponds to an operating fluid level of the fluid in the reservoir, and a third receiver configured to be positioned along the exterior surface of the reservoir at a third preselected vertical position that corresponds to a minimum fluid level of the fluid in the reservoir.

10. The system according to claim 1, further comprising an indicator in communication with the controller and configured to indicate the fluid level of the fluid determined by the controller.

11. A method for determining a fluid level of a fluid in a reservoir having an exterior surface, the method comprising:

positioning a plurality of emitters along the exterior surface of the reservoir such that each emitter of the plurality of emitters emits electromagnetic energy into the reservoir;

positioning a plurality of receivers along the exterior surface of the reservoir such that each receiver of the plurality of receivers is directed towards the plurality of emitters and receives electromagnetic energy passing out of the reservoir, wherein each receiver outputs receiver signals that correspond to the electromagnetic energy received, and wherein the electromagnetic energy received by each receiver is attenuated relative to the electromagnetic energy emitted by the plurality of emitters into the reservoir;

sequentially activating, with a controller, each emitter such that each receiver outputs a receiver signal as each emitter is activated;

receiving, with the controller, a receiver signal from each receiver as each emitter is activated;

calculating, with the controller, difference values for each receiver signal, wherein the difference value is the difference between a value of the receiver signal and a value of the electromagnetic energy emitted by the emitter that is activated; and determining, with the controller, the fluid level in the reservoir based on the sum of the difference values for each receiver.

12. The method according to claim 11, further comprising indicating, with an indicator, the fluid level determined by the controller.

13. The method according to claim 11, further comprising generating, with each receiver, an ambient light signal having an ambient light value when the emitters in the plurality of emitters are deactivated to thereby measure ambient light passing through the reservoir; and wherein the controller subtracts one of the ambient light values from each value of the receiver signal.

14. A system for determining a fluid level of a fluid, the system comprising:

a reservoir configured to contain the fluid and having an interior surface and an opposite, exterior surface;

a plurality of emitters positioned along the exterior surface of the reservoir and configured to emit electromagnetic energy into the reservoir;

a plurality of receivers positioned along the exterior surface of the reservoir directed toward the plurality of emitters such that the plurality of receivers receive electromagnetic energy passing out of the reservoir, and wherein the electromagnetic energy received by the plurality of receivers is attenuated relative to the electromagnetic energy emitted by the plurality of emitters into the reservoir;

a controller operably coupled to the plurality of emitters and the plurality of receivers, wherein the controller:

sequentially activates each emitter of the plurality of emitters such that each receiver of the plurality of receivers outputs a receiver signal as each emitter is activated;

receives a receiver signal from each receiver as each emitter is activated;

calculates difference values for each receiver signal, wherein the difference value is the difference between value of the receiver signal and value of the electromagnetic energy emitted by the emitter that is activated;

sums the difference values for each receiver;

determines the fluid level in the reservoir based on the sum of the difference values for each receiver; and an indicator operably coupled to the controller that indicates the fluid level determined by the controller.

15. The system according to claim 14, wherein when the plurality of emitters are deactivated each receiver outputs an ambient light signal having an ambient light value; and wherein controller subtracts one of the ambient light values from each value of the receiver signal.

16. The system according to claim 14, wherein the controller has a memory with empty reservoir values stored thereon; and wherein the controller subtracts one of the empty reservoir values from each value of the receiver signal.

\* \* \* \* \*